United States Patent
Chedas et al.

(10) Patent No.: US 9,876,598 B2
(45) Date of Patent: Jan. 23, 2018

(54) SWITCH FOR TRANSMISSION OF DATA BETWEEN HETEROGENEOUS NETWORKS FOR AIRCRAFT

(71) Applicant: THALES, Courbevoie (FR)

(72) Inventors: Jean-Philippe Chedas, Saubens (FR); Rémy Touron, Gratentour (FR)

(73) Assignee: THALES, Courbevoie (FR)

( * ) Notice: Subject to any disclaimer, the term of this patent is extended or adjusted under 35 U.S.C. 154(b) by 28 days.

(21) Appl. No.: 14/884,537

(22) Filed: Oct. 15, 2015

(65) Prior Publication Data

US 2016/0112151 A1 Apr. 21, 2016

(30) Foreign Application Priority Data

Oct. 17, 2014 (FR) ...................................... 14 02344

(51) Int. Cl.
| | |
|---|---|
| *H04J 3/06* | (2006.01) |
| *H04L 29/08* | (2006.01) |
| *H04L 12/40* | (2006.01) |
| *H04L 12/46* | (2006.01) |

(52) U.S. Cl.
CPC .......... *H04J 3/0658* (2013.01); *H04J 3/0605* (2013.01); *H04L 12/40169* (2013.01); *H04L 12/4625* (2013.01); *H04L 67/12* (2013.01); *H04L 2012/4028* (2013.01)

(58) Field of Classification Search
None
See application file for complete search history.

(56) References Cited

U.S. PATENT DOCUMENTS

| | | | |
|---|---|---|---|
| 2003/0093798 A1* | 5/2003 | Rogerson | H04L 12/28 725/75 |
| 2003/0182404 A1* | 9/2003 | Saint-Etienne | G06F 13/4027 709/220 |
| 2006/0120399 A1* | 6/2006 | Claret | H04L 12/413 370/445 |
| 2007/0127521 A1* | 6/2007 | Sandell | H04L 25/05 370/466 |
| 2007/0230501 A1 | 10/2007 | Bibby et al. | |
| 2013/0170498 A1 | 7/2013 | Danielsson et al. | |

FOREIGN PATENT DOCUMENTS

EP 1 583 289 A2 10/2005

OTHER PUBLICATIONS

ARINC: "AFDX/ARINC 664 Tutorial 1500-049)," Condor Engineering, May 2005, XP002429136 <http://www.acalmicrosystems.co.uk/whitepapers/sbs8>.

* cited by examiner

*Primary Examiner* — Steven H Nguyen

(74) *Attorney, Agent, or Firm* — Baker & Hostetler LLP

(57) ABSTRACT

A data transmission switch configured to be carried onboard an aircraft comprises: at least one input configured to receive data from a flight management computer on a first transmission channel, the channel functioning in multidirectional mode; at least one output configured to transmit the data to at least one avionic equipment on a second transmission channel, the switch further comprising a transducer configured to generate instructions for synchronization of the second transmission channel. The invention enables retrofitting to aircraft with an old avionic system under very economic conditions.

9 Claims, 9 Drawing Sheets

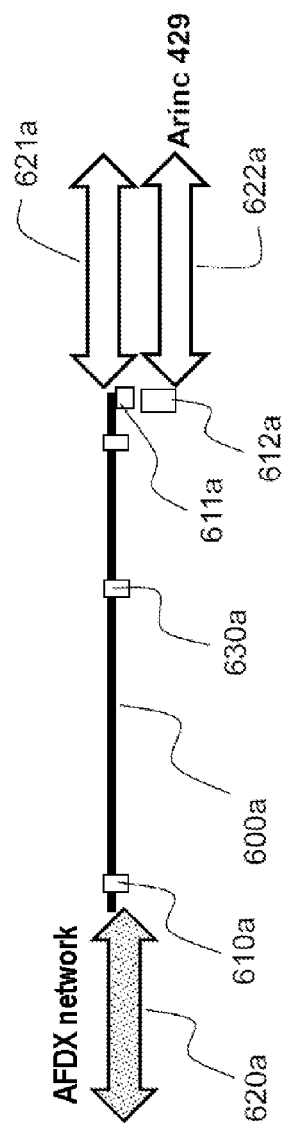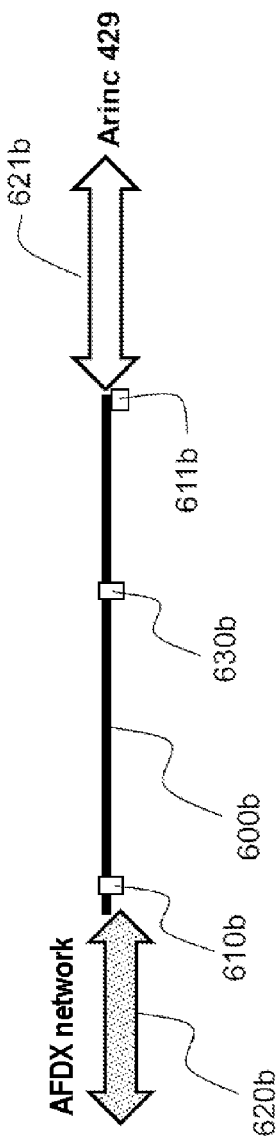
FIG.6a
FIG.6b

SWITCH FOR TRANSMISSION OF DATA BETWEEN HETEROGENEOUS NETWORKS FOR AIRCRAFT

CROSS-REFERENCE TO RELATED APPLICATION

This application claims priority to foreign French patent application No. FR 1402344, filed on Oct. 17, 2014, the disclosure of which is incorporated by reference in its entirety.

FIELD OF THE INVENTION

The present invention concerns the avionic field. It more specifically concerns communications between avionic systems utilizing heterogeneous communication protocols and synchronization means.

BACKGROUND

So-called avionic systems comprise all the electronic, electrical and computer equipment that assist the control of aircraft.

Historically, avionic equipment has consisted of separate modules communicating with one another by means of unidirectional links and potentially synchronous communication protocols. In this architecture, each of the various avionic equipments (for example, a flight management system, a flight guidance system, a terrain alert system or a display) communicates separately with the equipment with which it must interact in accordance with a potentially synchronous point-to-point or point-to-multipoint communication. In the context of unidirectional communication means, a unit is either a transmitter or a receiver of data. When the transmission of the data between two units must be effected in both directions, first transmission means transmit the data from the first unit to the second and second transmission means transmit in the opposite direction.

Point-to-point communication between two remote units may notably be effected via an ARINC 429 bus (from the name of the company Aeronautical Radio, INCorporated, which publishes the standards defined by the AEEC (Airlines Electronic Engineering Committee) relating to aircraft internal buses and networks and protocols used in aeronautics). The ARINC 429 bus, which may also be referred to as the A429 bus in this application, is standardized. It comprises a physical layer composed of an armored twisted pair and a transport layer. The transport layer may be used in accordance with various protocols for communication between avionic equipments. The protocols used by these units to communicate may be synchronous. For example, in the context of the Williamsburg file transfer protocol, defined by the ARINC 429 P3-18 standard, an avionic equipment must request authorization to send data, by sending a "Request to send" message to a receiver unit, which must authorize the sending of data by sending a "Clear to send" message. An ARINC 429 bus is a unidirectional communication bus comprising a single transmitter and up to 20 receivers.

In some cases, point-to-point communication between two avionic equipments may be performed using a shared memory. This is the case in some avionic system architectures, for example, for communication between the flight management system and the flight control system, in order to allow faster transmission of information. The transmission of information is then also effected in a synchronous manner: in order to prevent concurrent access to the shared memory, a memory area indicates if the memory is being written and can be read or not. Communication between the flight management computer and the flight control computer is performed bidirectionally, the two units exchanging information inside the shared memory. In particular, the flight management computer can send guidance orders to the flight guidance computer. Conversely, the flight guidance computer can send information to the flight management computer advising it of its status and what guidance orders are expected.

Avionic system architectures based on unidirectional links have some limitations. In particular, the number of links increases very rapidly with the number of avionic equipments. This makes adding new units to the avionic system more complicated. Moreover, in the case of ARINC 429 bus links, the installation of a large number of cables increases the weight of the aircraft.

In order to alleviate these drawbacks, modular avionic system architectures have been designed. For example, the AFDX bus (Avionics Full-DupleX Ethernet switching), standardized by the ARINC 664 standard, part 7, proposes an Ethernet type bus complying with specific safety constraints. Whilst preserving the flexibility and the global functioning of an Ethernet bus, it incorporates redundancy for sending packets and a packet switching system managing queues so that only one packet at a time circulates on the network. This system makes it possible to avoid data packet collisions and to ensure deterministic transmission of data that is indispensable for an aeronautical system.

An avionic system with an architecture based on an AFDX bus is much more adaptable than a system based on unidirectional links. In fact, it suffices in order to add a unit to connect it to the AFDX bus and to assign it a network address, rather than creating and testing separately new unidirectional connections. Moreover, once the equipment has been installed, it is possible to add to it additional functionality simply by updating the software. Communication over an AFDX bus is not synchronous: each unit sends data packets to a target unit, and packets can be sent simultaneously in the network, their circulation being controlled in such a manner as to prevent collisions. Moreover, communications on an AFDX bus are simultaneous multidirectional: two units can transmit data to each other simultaneously via the same AFDX data bus.

AFDX bus installation has facilitated the adoption of new equipment in aircraft. Also, numerous recent functionalities have been developed for flight management computers communicating via an AFDX network. Amongst these recent functionalities, CDA (Continuous Descent Approach) procedures make it possible to save fuel as aircraft descend. These functionalities would be complex to redevelop for a flight management computer using synchronized links. Similarly, it is relatively easy to deploy new elements, for example tactile interfaces offering improved performance in an avionic system in which communication between units is based on an AFDX bus.

It is much more complicated to add new functionalities to an aircraft as and when they are designed when communication between elements was initially designed to use a point-to-point synchronous mode. This problem is particularly important where the flight management system is concerned, to which new functionalities are regularly added, notably enabling fuel saving.

A naïve solution to this problem consists in replacing all the avionic equipment of an aircraft with equipment communicating using an AFDX bus. This solution is in practice inoperable. It is in fact extremely costly and forces immobilization of the aircraft for a time period that is unacceptable for an airline.

The patent US20070127521 describes a method for converting messages in accordance with heterogeneous buses or protocols, for example an AFDX bus and an ARINC 429 bus. However, it proposes only direct conversion of packets between two buses and therefore does not address the problem of synchronization of the communication channels. An avionic equipment where communication is based on the AFDX bus would therefore have to emulate synchronous communication as defined in a protocol conforming to the ARINC 429 standard, for example by sending messages conforming to the Williamsburg protocol on an AFDX bus. Moreover, it does not address other types of communication between avionic equipments, such as communication using shared memory.

In order to solve the aforementioned problem, one object of the present invention is to propose an avionic system enabling the insertion of a flight management computer with communication based on a multidirectional channel, for example an AFDX bus, into a set of avionic equipments utilizing synchronous communication.

SUMMARY OF THE INVENTION

To this end, the invention consists in a data transmission switch for an aircraft, comprising: an input configured to receive data from a flight management computer on a first transmission channel, said channel functioning in multidirectional mode, and an output configured to transmit said data to an avionic equipment on a second transmission channel, said switch further comprising a transducer configured to generate instructions for synchronization of said second transmission channel.

Advantageously, the instructions of synchronization of the second transmission channel comprise a verification of a possibility of transmission of data; an indication of a start of transmission of data; an indication of an end of the transmission of data.

In one embodiment of the invention, said output is connected to a memory shared between the switch and said avionic equipment.

Advantageously, the transducer is configured to verify a state of a semaphore to verify the possibility of a transmission of data, to seize said semaphore prior to the transmission of data and to release said semaphore at the end of the transmission of data.

In another embodiment of the invention, said output is connected to an ARINC 429 data bus.

Advantageously, the output data is sent in accordance with the Williamsburg protocol and the transducer is configured to send an "RTS" message to verify the possibility of a transmission of data, to send an "SOT" message prior to the transmission of data and to send an "EOT" message at the end of the transmission of data.

Advantageously, the first transmission channel is an AFDX data bus.

In one embodiment of the invention, the switch comprises a second output connected to an ARINC 429 bus to transmit the data to an additional avionic equipment.

In one embodiment of the invention, the switch is configured to transmit data on said second output in accordance with a periodic cycle.

The invention also concerns a data transmission method intended to be executed by an equipment for an aircraft, said method comprising receiving, on an input, data from a flight control computer on a first transmission channel, said channel functioning in multidirectional mode, transmitting, on an output, said data to an avionic equipment on a second transmission channel, said method further comprising generating instructions of synchronization of said second transmission channel.

The invention also concerns an avionic system comprising a switch in accordance with the invention and further comprising a tactile man-machine interface able to communicate simultaneously in accordance with an ARINC 661 protocol and an ARINC 739 protocol.

BRIEF DESCRIPTION OF THE DRAWINGS

Other features will become apparent on reading the following detailed description given by way of nonlimiting example that refers to the appended drawings in which:

FIGS. 6a, 6b and 6c show three examples of a data communication system in accordance with the invention;

Figure 1:
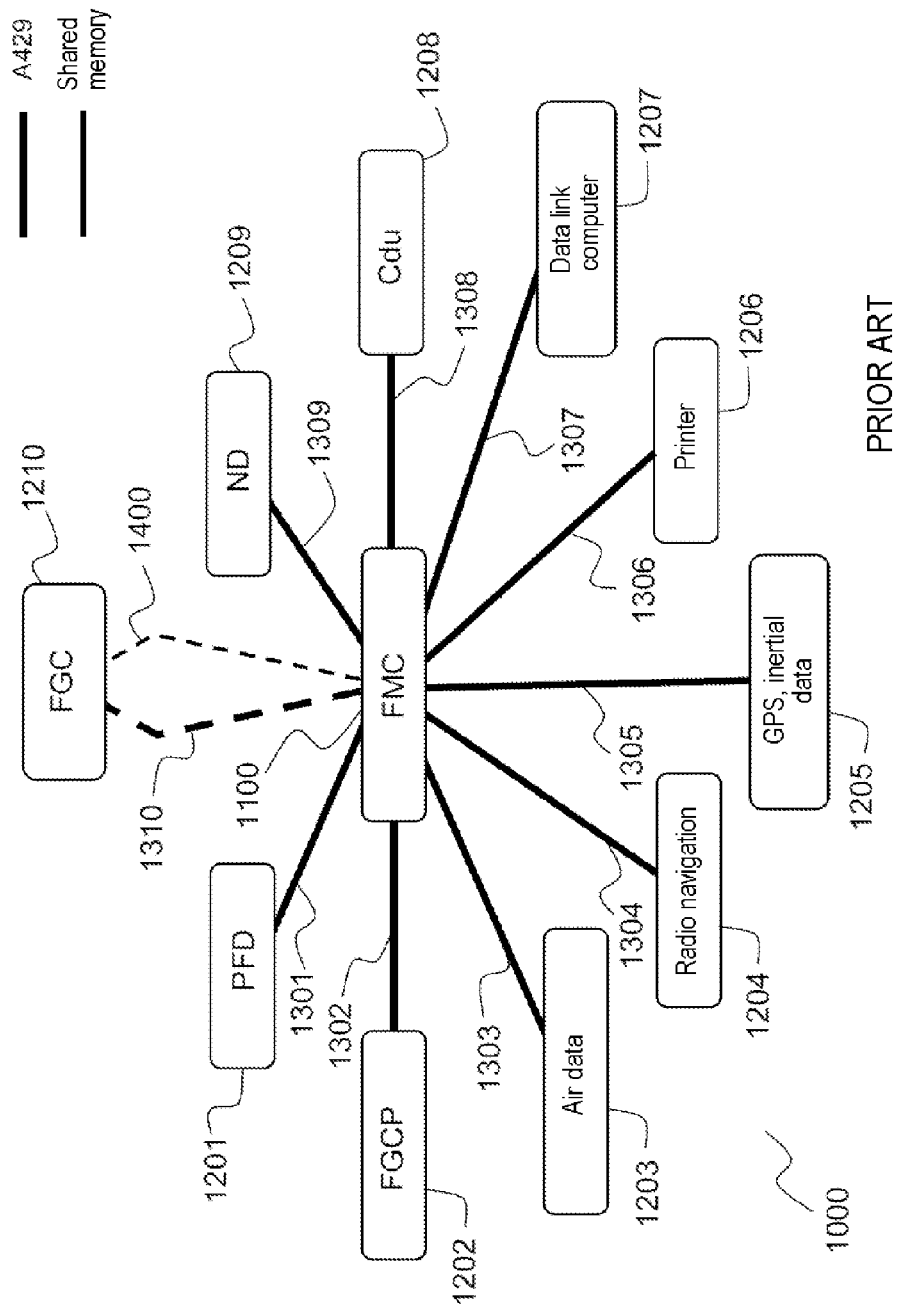
FIG. 1 shows an example of a prior art avionic system in which a flight management computer communicates with avionic equipments via unidirectional links.

Some English abbreviations routinely used in the technical field of the present application may be employed in the description. These abbreviations are listed in the table below, with their full expression and their meaning.

| Abbreviation | Expression | Meaning |
| --- | --- | --- |
| ACK | Acknowledgement | Computer signal sent by a receiver to indicate to the sender that the connection has been set up or that the message transmitted has been received. |
| AFDX | Avionics Full DupleX | Redundant Ethernet network rendered reliable, developed and standardized by the European avionics industry. |
| ARINC | Aeronautical Radio INCorporated | Company owned by the major players in American aeronautics known for drawing up the main standards governing communication onboard aircraft and between aircraft and the ground. Refers both to company and to the standards issued, for example the standards ARINC 429 and ARINC 661. |

| Abbreviation | Expression | Meaning |
| --- | --- | --- |
| CDU | Control Display Unit | Control and display panel onboard an aircraft for viewing information on the status of the aircraft and entering instructions. |
| COM | COMmand | In an onboard card architecture known as COM MON, the COM card is responsible for calculations and commands. |
| CTS | Clear To Send | Williamsburg protocol message from a receiver to a sender indicating that the sending of data is possible. |
| DMC | Display Management Computer | Computer receiving data from different avionic systems and manipulating the data in order to display the data on external monitors. |
| EIS | Electronic Instrument System | Display instrument system for aircraft cockpits, within which the instruments are electronic. |
| EOT | End Of Transmission | Williamsburg protocol message from a sender to a receiver indicating the end of the transmission of data. |
| FGC | Flight Guidance Computer | Computer for supplying indications to aeronautical equipment (engine thrust, extension of slats and flaps, etc.) in order to follow a predefined flight path. |
| FGCP | Flight Guidance Control Panel | Panel indicating the status of the flight guidance computer and monitoring some of its functionalities. |
| FM | Flight Management | Set of techniques and systems for controlling the flight path of an aircraft. |
| FMC | Flight Management Computer | Computer for calculating aircraft flight paths and flight plans and supplying appropriate guidance set points to the pilot or the automatic pilot to follow the calculated flight path. |
| FMS | Flight Management System | Computer system for calculating aircraft flight paths and flight plans and supplying appropriate guidance set points to the pilot or the automatic pilot to follow the calculated flight path. |
| GPS | Global Positioning System | Satellite-based positioning system. |
| IMDU | Interactive Multi Display Unit | Man-machine interface onboard an aircraft able to communicate in accordance both with an ARINC 661 protocol and an ARINC 739 protocol. |
| LDU | Link Data Unit | Unit for transmission of Williamsburg protocol data comprising from 3 to 255 words. |
| MCDU | Multi Control Display Unit | Man-machine interface that can be integrated into a cockpit to display and enter numerous items of information linked to the FMS. |
| MON | MONitor | In a COM MON architecture, the MON card is responsible for the verification of calculations. |
| ND | Navigation Display | Cockpit display showing the lateral flight path. |
| PFD | Primary Flight Display | Display that can be integrated into a cockpit. |
| RTS | Request To Send | Williamsburg protocol message from a sender to a receiver requesting opening of a channel to send data. |

DETAILED DESCRIPTION

In the remainder of the description, the method in accordance with the invention is illustrated by examples relating to the transmission of flight commands between a flight management computer sending commands over an AFDX type multidirectional network and a flight control computer receiving its instructions via an input whose management incorporates a synchronization protocol. It should however be noted that the invention may also apply to communications between a flight management computer and other avionic equipments as well as to communications between a tactile interface and avionic equipments.

FIG. 1 shows an example of a prior art avionic system in which a flight management computer communicates with avionic equipments via unidirectional point-to-point links.

This avionic system 1000 comprises an FMC 1100 the role of which is to predict an aircraft flight path and to supply flight set points to the FGC 1210 in order to fly the predicted flight path, as well as to supply to display units data for the display of the flight path. To this end, the FMC is notably connected to a PFD 1201, an FGCP 1202, air data 1203, a radio navigation device 1204, positioning tools (GPS and inertial data) 1205, a printer 1206, a data link computer 1207, a CDU 1208, an ND 1209 and an FGC 1210. In some data links the FMC is the sender and the second avionic equipment is the receiver of data. This is the case for example of the link between the FMC 1100 and the ND 1209, within which the FMC 1100 supplies a graphical representation of the flight path to the ND 1209. In other links, the FMC 1100 is the receiver of data and the second unit is the sender. This is the case for example of the link 1303 in which the sensors 1203 supply position and speed information to the FMC 1100. In other links the FMC 1100 is both a receiver and a sender of data. This is the case for example of the link between the FMC 1100 and the FGC 1210 in which the FMC 1100 supplies instructions on the flight path to be followed to the FGC 1210 and the FGC 1210 supplies information on the guidance mode selected to the FMC 1100.

The FMC 1100 is connected to these various units by respective ARINC 429 data buses 1301, 1302, 1303, 1304, 1305, 1306, 1307, 1308, 1309, 1310. The ARINC 429 standard defines a unidirectional data bus with a single sender and 20 receivers maximum. This architecture is therefore complex to implement. Some communication protocols on ARINC 429 links, for example the Williamsburg protocol, use synchronous communications. Others, for example the ARINC 702 protocol for the link to the ND, do not include synchronization elements.

The FGC 1210 receives instructions from the FMC 1100 on the flight path to be followed. It converts these instructions into a set of commands enabling the required flight path to be maintained. These commands integrate for example the deployment or the retraction of slats and flaps or the modulation of the thrust from each of the engines. The FMC 1100 can supply instructions to the FDC 1210 via the ARINC 429 link 1310. It can also supply them via a shared memory 1400. This shared memory makes it possible to supply instructions much faster. When this solution is adopted, the FMC 1100 and the FDC 1210 must be disposed contiguously in the cockpit of the aircraft and have read/write access to this same memory area 1400.

Figure 2:
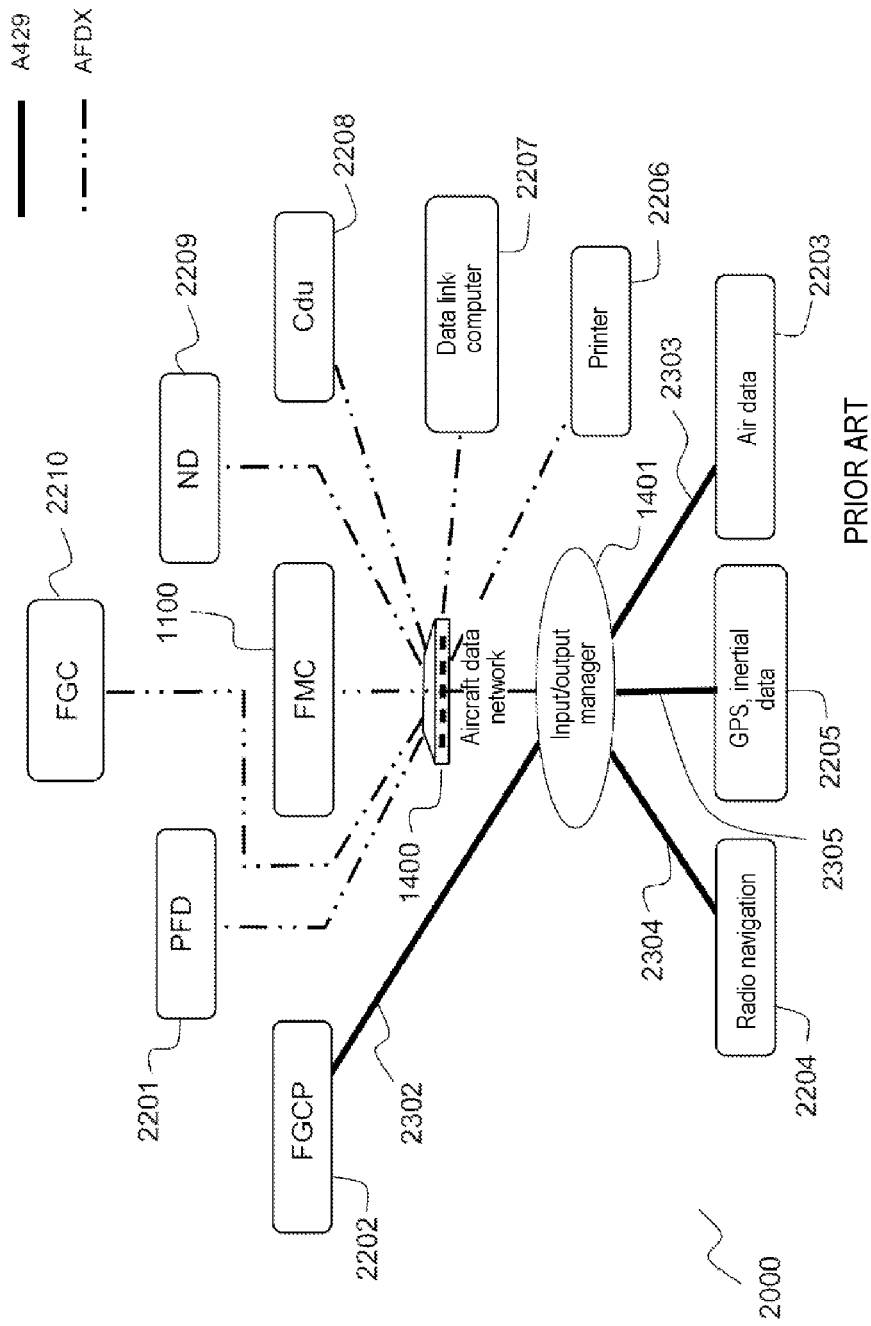
FIG. 2 shows an example of a prior art avionic system in which a flight management computer communicates with avionic equipments via an AFDX bus.

FIG. 2 shows an example of a prior art avionic system 2000 in which a flight management computer communicates with avionic equipments via an AFDX bus.

In this system, the FMC 2100, PFD 2201, FGCP 2202, air data 2203, radio navigation device 2204, positioning tools (GPS and inertial data) 2205, printer 2206, data link computer 2207, CDU 2208, ND 2209 and FGC 2210 have the same functionalities as, respectively, the FMC 1100, PFD 1201, FGCP 1202, air data 1203, radio navigation device 1204, positioning tools (GPS and inertial data) 1205, printer 1206, data link computer 1207, CDU 1208, ND 1209 and FGC 1210 present in the system 1000.

Most units of the system 2000 are interconnected by a data network 1400 of the aircraft. This network is based on a multidirectional data bus, for example an AFDX bus. This system makes it possible to install new equipment and to upgrade existing equipment much more easily than the ARINC 429 links or shared memory of the system 1000. The avionic systems of recent aircraft, for example the Airbus A380, are generally organized on the model of the system 2000.

In the system 2000, some units, for example the FGCP 2202, the air data 2203, the radio navigation tools 2204 and the positioning tools 2205 can communicate only via ARINC 429 links, for example the links 2302, 2303, 2304 and 2305. In this case, an input-output manager 1401 can effect the conversions between the data on the ARINC 429 links 2302, 2303, 2304 and 2305 and the AFDX network 1400. This conversion consists entirely in extracting the data contained in the ARINC 429 packets and encapsulating them in AFDX packets, and vice versa.

Figure 3A:
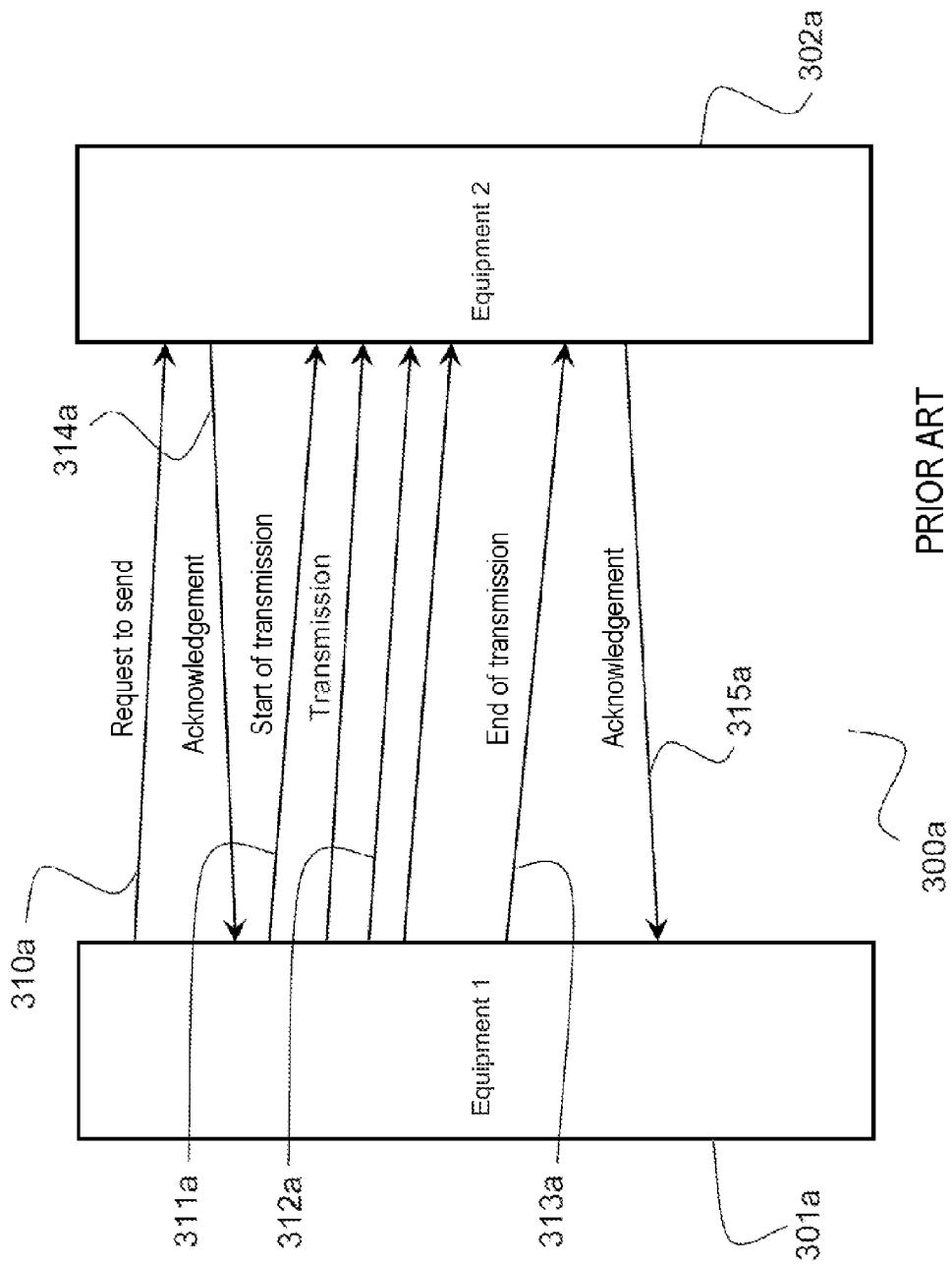
FIGS. 3a and 3b show two examples of protocols for synchronous communication between an FMC and an avionic equipment in accordance with the prior art, respectively in the case of a synchronous communication protocol over an ARINC 429 bus and using a shared memory.
Figure 3B:
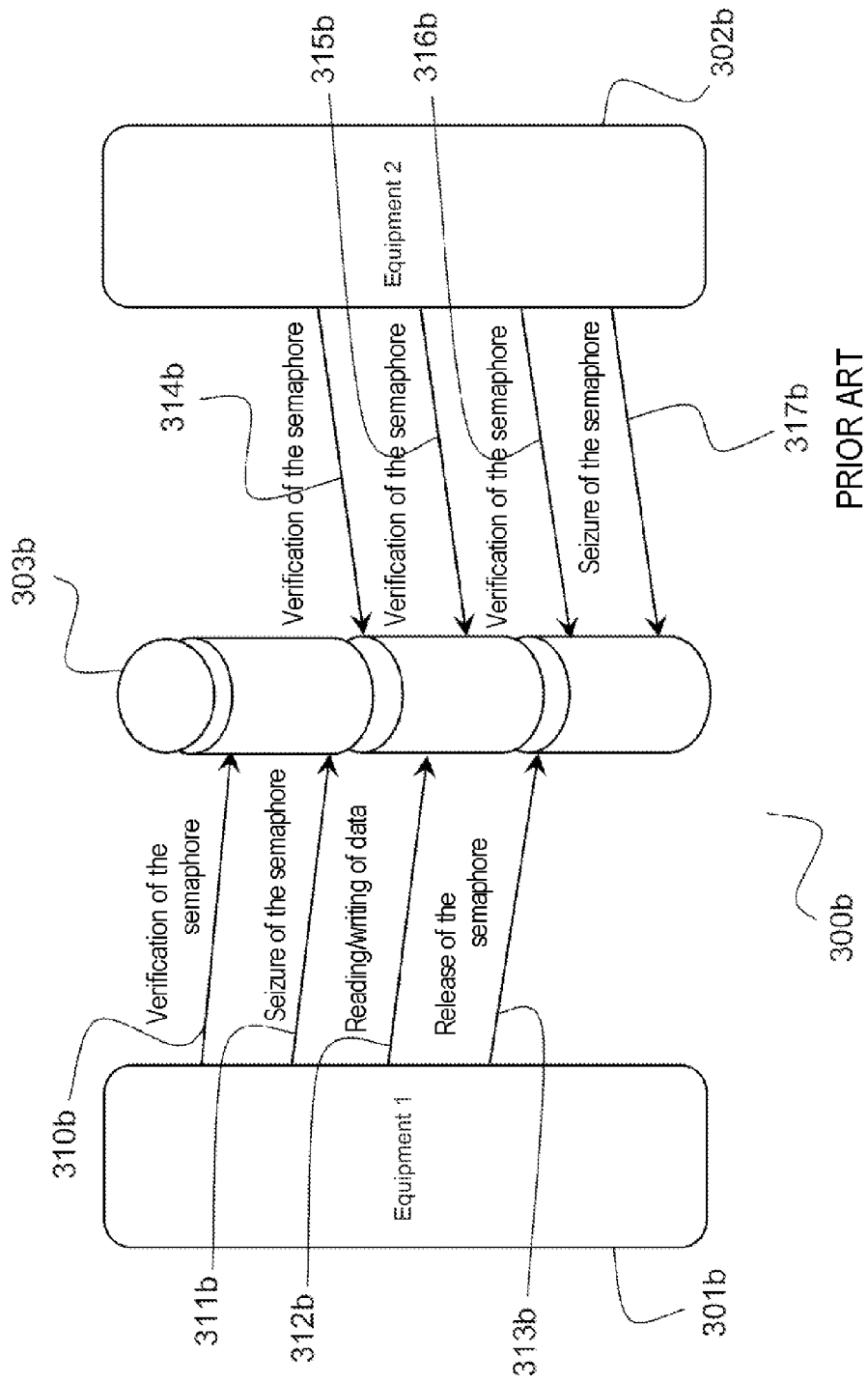

FIGS. 3a and 3b show two examples of synchronous communication protocols between an FMC and a prior art avionic equipment, respectively in the case of a synchronous communication protocol on an ARINC 429 bus and via a shared memory.

FIG. 3a shows an example of a synchronous communication protocol 300a between an FMC and a prior art avionic equipment in the case of communication via an ARINC 429 data bus. This protocol may be the Williamsburg protocol for the links to the ground-air data link equipment.

In the context of a synchronous communication protocol, the sender unit must be sure that transmission is possible and indicate the start and the end of the transmission of the data. To this end, in a first step, a first unit, for example the FMC 1100, sends a request to send 310a to a second avionic equipment 302a. In the case of the Williamsburg protocol, this is an RTS message. The unit 302a responds with an acknowledgement 314a indicating that transmission is possible. In the Williamsburg protocol, this acknowledgment may be a CTS message. The unit 301a then sends a start of transmission message 311a (SOT message in the Williamsburg protocol) and then transmits the data using at least one message 312a. In the context of the Williamsburg protocol, these are LDU blocks comprising from 3 to 255 words. The number of messages sent then depends on the quantity of data to be transferred. When the transmission of the data has completed, the unit 301a sends an end of transmission message 313a (EOT message in the Williamsburg protocol) to which the unit 302a responds with an acknowledgement 315a (keyword ACK in the Williamsburg protocol). This set of synchronization requests and messages makes it possible to be sure that the data is sent when the receiver is ready to receive it, that there is no interference between different transmissions of data, and that the data has been received by the unit 302a.

FIG. 3b shows an example of a synchronous communication protocol 300b between an FMC and a prior art avionic equipment in the case of communication using shared memory.

In this example, a first unit 301b writes data in a memory 303b that is read by a second unit 302b. For example, in the architecture 1000, it may be the FMC 1100 that writes the instructions for the flight path to be followed in the memory 1400, which is read by the FGC 1210.

The memory 303b possesses a semaphore. The semaphore makes it possible to be sure that the memory is not read and written at the same time. When the unit 301b foresees sending commands to the unit 302b, it first verifies that the semaphore is available 310b. It then seizes the semaphore 311b and then writes the data 312b before releasing the semaphore 313b.

At the same time, the unit 302b, configured in this example to receive instructions from the unit 301b, periodically verifies if the semaphore is available 314b, 315b, 316b. At the time of the verifications 314b and 315b, the semaphore is not available because the unit 301b is in the process of writing the data 312b and has not yet released it 313b. The unit 302b therefore continues to verify the availability of the semaphore without accessing the memory. By the time of the verification 316b the unit 301b has finished writing and the semaphore is free. The unit 302b then seizes the semaphore 317b and then reads the memory data that has been transmitted to by the unit 301b.

This protocol makes it possible to exchange data between a unit 301b and a unit 302b via a shared memory, which makes it possible to exchange data very rapidly. The system of verification, seizing and releasing of the semaphore makes it possible to be sure that data is not read and written at the same time. The above example is an example of a protocol in which the unit 301b supplies data or instructions to the unit 302b. More complex examples in which the two units read and write data successively are also possible.

Figure 4:
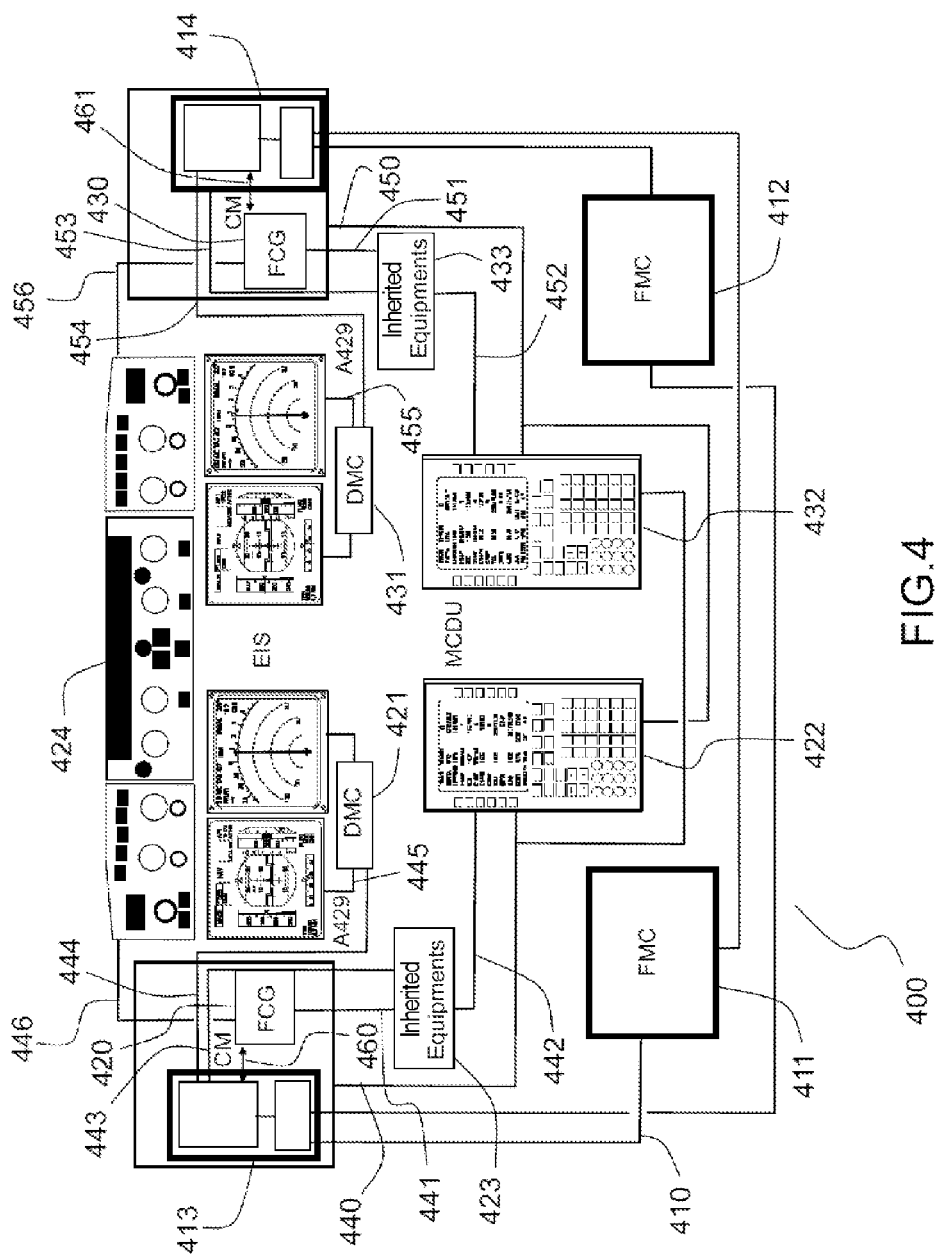
FIG. 4 shows an example of an avionic system in accordance with the invention.

FIG. 4 shows an example of an avionic system in accordance with the invention.

This system comprises numerous avionic equipments connected to ARINC 429 data bus inputs/outputs. These units may for example come from an avionic system 1000. These units comprise two FGC 420, 430; two DMC 421, 431; two MCDU 422, 432; inherited systems 423, 433; an FGCP 424. The inherited systems 423, 433 may for example comprise a PFD 1201, an FGCP 1202, air data 1203 or a radio navigation unit 1204. These units notably communicate by means of ARINC 429 data buses 440, 441, 442, 443, 444, 445, 446, 450, 451, 452, 453, 454, 455, 456.

In this avionic system, most units are duplicated in order to protect against failure of one of the units.

This system according to the invention comprises at least one switch 413, 414 configured to be carried onboard the aircraft carrying the avionic system 400. This switch has at least one input configured to receive flight commands from a flight management computer 411, 412 on a first transmission channel 410, said channel functioning in multidirectional mode. It also has at least one output configured to transmit said flight commands to a flight control computer on a second transmission channel, said processor further including a transducer configured to generate instructions for synchronization of said transmission channel.

In one embodiment of the invention, the output of the switch is connected to a memory 460, 461 shared between the switch and the flight control computer.

In another embodiment of the invention, the output of the switch is connected to an ARINC 429 data bus over which flight path information is sent to the flight control computer.

The switch advantageously has at least one second output connected to an ARINC 429 data bus enabling transmission of data from the flight management computer to an avionic equipment, and said transducer is advantageously configured to generate the messages for synchronization of said ARINC 429 data bus.

The multidirectional functioning of the transmission channel 410 makes possible greater flexibility in the transmission of messages between a flight management computer 411, 412 and a flight control computer 420, 430, and where applicable at least one other avionic equipment. The switch 413, 414 makes it possible to manage the synchronization of the links with the other avionic equipments, whether these are links via shared memory 460, 461 or ARINC 429 links.

The first data transmission channel is advantageously connected to an AFDX bus.

This system makes it possible to integrate a flight management computer 411, 412 communicating via a multidirectional transmission channel, for example an AFDX bus, to an avionic system in which most units communicate via ARINC 429 links or shared memory. It is extremely beneficial because the synchronization of the data between the flight management computer and the other avionic equipments, including the flight control computer, is managed by the switch 413, 414. The flight management computer can therefore send or receive data as it would in an avionic system in which communications are based on an AFDX bus, such as the system 2000. This enables much greater flexibility in adding new functionalities to the flight management computer.

Some ARINC 429 links are managed by a communication protocol including synchronization instructions, for example the Williamsburg protocol. Other links are not governed by a communication protocol including synchronization instructions, but may be subject to other constraints. This is the case for example of the link to the ND. It is in fact governed by the ARINC 702 protocol that does not include synchronization instructions, but the ND must receive data at regular intervals in order to refresh the display without errors. Moreover, the quantities of data sent must be sufficiently small that they do not saturate the memory capacity of the unit ND. To this end the switch is advantageously configured to transmit data on at least one second output in accordance with a periodic cycle.

Moreover, this system in accordance with the invention has the advantage that it can be deployed easily in an older generation avionic system in which most communications are based on ARINC 429 buses, such as the system 1000. In fact, complete replacement of an avionic system 1000 essentially based on ARINC 429 communications by an avionic system 2000 essentially based on AFDX communications is extremely time-consuming and costly, and therefore difficult for an airline to apply. On the other hand, the transformation of an avionic system based on ARINC 429 communications such as the system 1000 into a system in accordance with the invention is relatively easy: its suffices to replace the existing flight management computer with the switch in accordance with the invention, to deploy a multidirectional data channel, for example an AFDX bus, and then to connect at least the flight management computer to the multidirectional data channel. This retrofit operation can be carried out in a very short time, for example overnight while the aircraft is on a stopover, which does not generate any loss of operation for the airline.

Once the system in accordance with the invention has been deployed, the addition of new units to the AFDX bus and the updating of the flight management computer are as easy as in an avionic system 2000 in which communications are essentially based on an AFDX bus.

During the conversion of a prior art avionic system into an avionic system in accordance with the invention, the communication channel between a switch 413, 414 and a flight control computer 420, 430 may be dependent on the communication channel initially in place in the prior art avionic system. For example, if the communication channel initially in place is a shared memory 1400, a switch 413 can write directly in this memory, which then becomes the memory 460 of the system 400. The flight control computer therefore reads its instructions in the shared memory as it did before, and no updating is necessary.

In another embodiment of the invention, if the communication channel initially in place between the flight management computer and the flight control computer is an ARINC 429 link 1310, the switch can send the flight management computer instructions on the same ARINC 429 link and the flight control computer receives its instructions on the same input channel. No updating is necessary in this case either.

Figure 5:
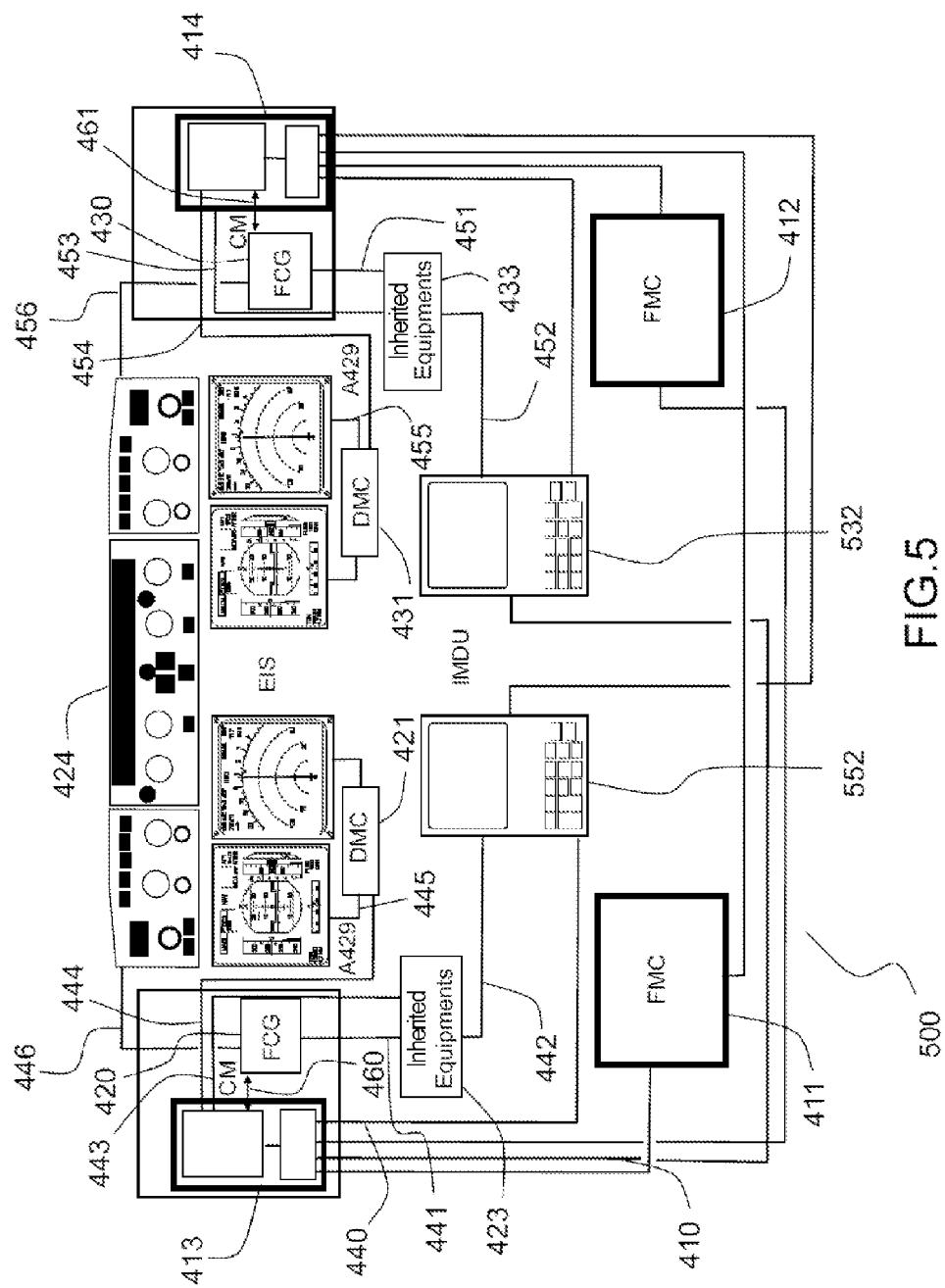
FIG. 5 shows an example of an avionic system in accordance with the invention comprising tactile interfaces.

FIG. 5 shows an example of an avionic system in accordance with the invention comprising tactile interfaces.

This avionic system 500 is similar to the avionic system 400 in accordance with the invention with the MCDU interfaces 422 and 432 replaced by tactile man-machine interfaces 522 and 532 connected to the AFDX data bus 410. In one embodiment of the invention, these tactile man-machine interfaces are capable of communicating in accordance with both an ARINC 739 protocol and an ARINC 661 protocol. They can then communicate with inherited units 423, 443 via ARINC 429 data buses 442, 452 using an ARINC 739 protocol and communicate with a flight management computer 411, 412 via an AFDX data bus 410 using an ARINC 661 protocol. These tactile interfaces are particularly advantageous because they make it possible both to interface with inherited avionic equipments communicating in accordance with an ARINC 739 protocol and more modern avionic equipments communicating via an ARINC 661 protocol.

FIG. 6a shows an example of a data transmission switch in accordance with one embodiment of the invention.

This data transmission switch is configured to be carried onboard an aircraft, for example in an avionic system 400 or 500. It has at least one input 610a configured to receive flight commands from a flight management computer, for example the computer 411 or 412, on a first channel 620a functioning in multidirectional mode. It also has at least one output 611a configured to transmit said flight commands to a flight control computer, for example the computer 420 or 430, over a second transmission channel 612a. The second transmission channel necessitating synchronizing with the receiving unit, this switch comprising a transducer 630a for generating the instructions for synchronization of said transmission channel.

In one embodiment of the invention, the instructions for synchronization of the second transmission channel may notably include at least:

a verification of a possibility of transmission of data;
an indication of the start of transmission of data;
the indication of the end of the transmission of data.

In one embodiment of the invention, the switch comprises a second output 612a connected to an ARINC 429 data bus 622a. This enables the switch 600a, by analyzing the destination unit, to send the messages either to the flight control computer via the channel 621a or to an avionic equipment via the ARINC 429 line 622a.

FIG. 6b shows an example of a data transmission switch in accordance with a second embodiment of the invention.

In this embodiment of the invention, at least one output 611b is connected to an ARINC 429 data bus over which the flight control computer receives its instructions.

In this embodiment of the invention, the first transmission channel is an AFDX data bus 620b and at least one output 611b also enables transmission of instructions to other avionic equipments.

In this embodiment of the invention, the transducer 630b is a programmable logic circuit configured to generate all of the synchronization messages of the communication protocols sent to the flight control computer and the other avionic equipments.

Figure 6C:
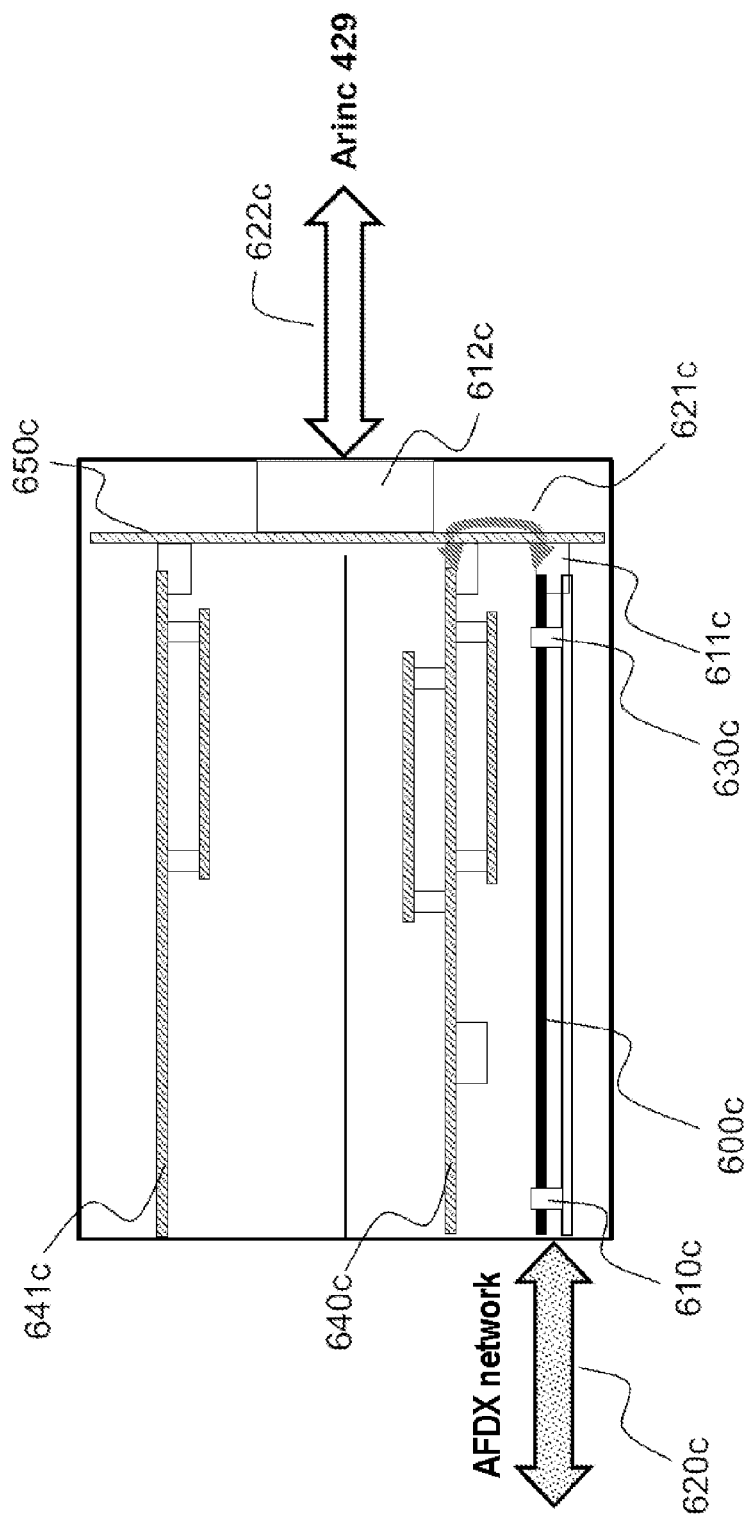

FIG. 6c shows an example of a data transmission switch in accordance with a third embodiment of the invention.

In this embodiment of the invention, the at least one output is connected to a memory 611c shared between the switch and the flight control computer.

In this embodiment of the invention the switch is contiguous with the flight control computer, consisting of a COM card 640c and an MON card 641c, and the switch 600c and the flight control computer 640c, 641c are interconnected by a gateway card 650c. In the COM MON architecture defined in this way, the COM card effects a first calculation of data and the MON card verifies the result of the calculation. The shared memory 611c is located on the switch and is accessed by the COM card of the flight control computer 640c.

In this embodiment of the invention, the switch has at least one second output 612c connected to an ARINC 429 bus 622c to communicate with at least one avionic equipment. This communication may be effected in accordance with a number of communication protocols, for example the Williamsburg protocol or the ARINC 702 protocol.

In the context of a link to an ND, the ND may necessitate the reception of a limited amount of data in a cyclic manner. These conditions are not complied with if the switch sends data to the ND directly after it is received. In this case the switch is advantageously configured to transmit data on at least one second output in accordance with a periodic cycle.

In this embodiment of the invention, the first transmission channel is an AFDX data bus 620c The switch 600c may include a processor configured to generate the messages for synchronization of the shared memory 611c and communication protocols for the second output 612c. In one embodiment of the invention, an operating system is installed on the switch. The drivers necessary for the various physical communications are then installed in the operating system, for example an AFDX driver for driving the AFDX data bus 620c, a shared memory driver for driving the shared memory 611c, an ARINC 429 bus driver for driving the output 612c to the bus 622c, etc. The transducer may then be a software module for synchronization of the communications at the various outputs on the basis of data received from the flight management computer.

Figure 7:
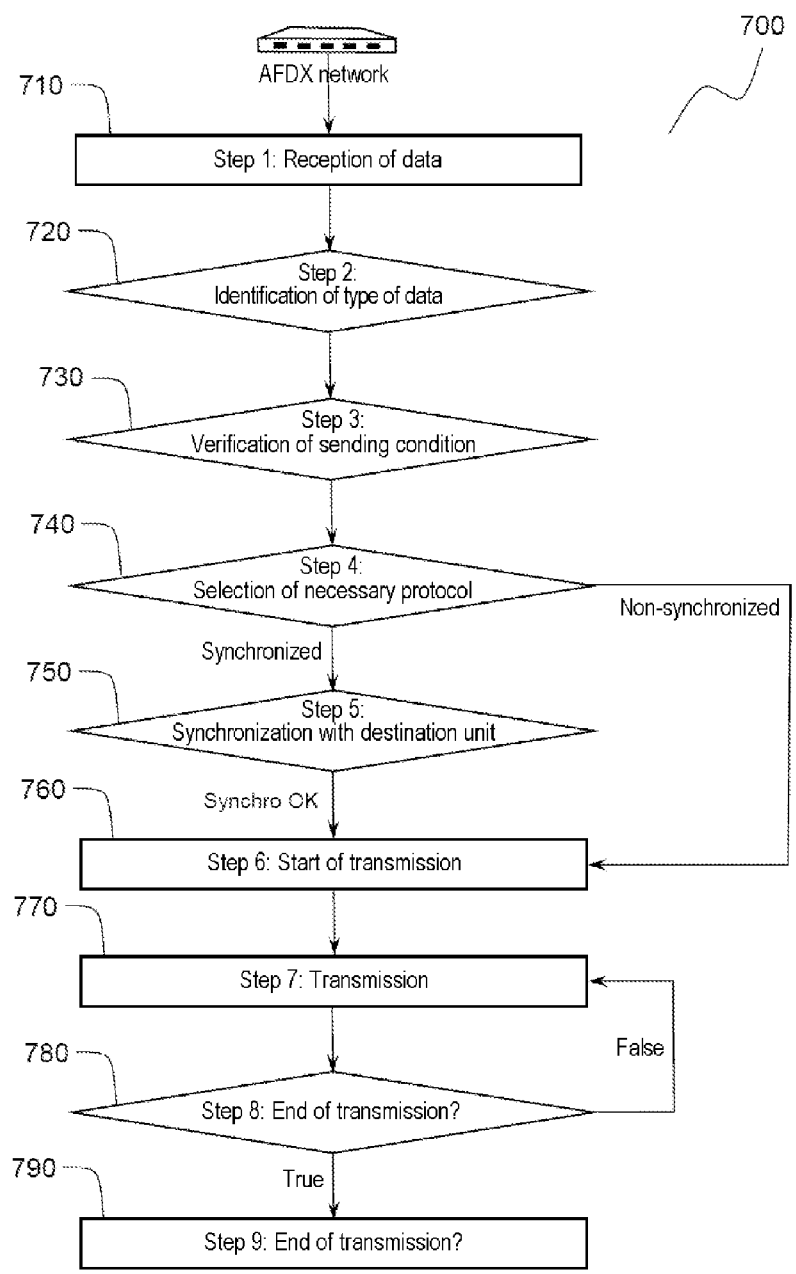
FIG. 7 shows an example of a data transmission method in accordance with one embodiment of the invention.

FIG. 7 shows an example of a data transmission method 700 in accordance with one embodiment of the invention. This method may notably be executed by a switch 600 to transmit data transmitted by the flight management computer via a multidirectional input channel to a flight control computer or another avionic equipment.

The method includes a first step 710 of receiving on at least one input flight commands from a flight management computer on a first transmission channel, said channel functioning in multidirectional mode. This first transmission channel may for example be connected to an AFDX network over which the flight management computer sends flight commands. The step 710 then comprises the reception of packets sent over the network and the analysis of their content.

The method includes a second step 720 of identification of the type of data. It notably comprises verification that the data was indeed sent by the flight computer. As a function of the type of data, the data will be sent to different avionic equipments. If it is a flight path instruction, the data will be sent to the flight control computer. Otherwise, for example if it is a flight path to be displayed, the data will be sent to the appropriate unit.

In one embodiment of the invention, the method may then include, for certain types of data, a step 730 of verification of a sending condition. This may be a time condition, for example. For example, if the flight control computer is configured to read instructions every 60 ms, then the step 730 may comprise waiting for a sending condition in order to respect this interval. For example, it may comprise waiting for the expiry of a clock or a cyclic event with an occurrence every 60 ms. In the context of sending data to an ND in accordance with an ARINC 702 protocol, the verification of the sending condition may relate to a purely temporal condition, in order to send the data in accordance with a regular cycle to refresh the display. It may also be based on a more complex condition, for example a condition allowing sending at the same time of data in a cyclic manner, but using packets of limited size as a function of the memory capacity of the destination unit.

The method 700 then includes a step 740 of selection of the necessary protocol. This protocol depends on the target unit. For example, in the case of transmission of data using shared memory, it may be a question of a memory synchronization and writing protocol such as the protocol 300b In the case of sending data using an ARINC 429 protocol, it may be a question of a Williamsburg type protocol such as the protocol 3000a. In one embodiment of the invention, in addition to protocols comprising synchronization information, the method 700 may transmit data in accordance with protocols with no synchronization. This is the case for example when the target unit is an ND, for which the communication protocol is the ARINC 702 protocol, which does not include synchronization messages. Messages not requiring synchronization of their communication channel can transmit via a switch in accordance with the invention on the same basis as messages that must be transmitted over a synchronous communication channel.

In the case of a protocol necessitating synchronization, the method 700 includes a step 750 of synchronization of the connection with the destination unit. The object of this step is to be sure that the destination unit is ready to receive the data and that the communication channel is indeed available. In an embodiment based on a shared memory, this step may include the verification of the availability of a semaphore 310b. In an embodiment based on a Williamsburg type protocol, this step may include sending a request to send message 310a (for example the RTS message) and receiving an acknowledgement 314a (for example the CTS message).

Once the synchronization has been effected, or directly after the selection of the protocol, the method 700 includes a start of transmission step 760. In the case of a communication protocol based on a shared memory, this may relate to seizing a semaphore 311b. In the case of a Williamsburg type protocol, this may relate to sending a start of transmission message 311a, for example an SOT message.

The method then includes a step of transmission of data 770 and of verification of the end of transmission 780. The method sends data 770 to the target unit as long as the transmission of the data has not ended 780. In an embodiment of the invention based on a shared memory, the transmission of the data includes writing data 312b for as long as there remains data to be written. In an embodiment of the invention based on a Williamsburg type protocol, the step 770 may comprise the transmission of packets 312a for all of the data.

The method includes a step 790 of notification of the end of transmission when the transmission of the data is completed. In an embodiment based on a shared memory, it may include releasing a semaphore 313b. In an embodiment of the invention based on a Williamsburg protocol, it may include sending an end of transmission message 313a, for example an "EOT" message in the Williamsburg protocol.

The above examples demonstrate the ability of a data transmission switch in accordance with the invention to establish communications between a flight computer sending commands over a multidirectional transmission channel, for example an AFDX bus, and units receiving their communications over a channel using synchronous communication. They are given by way of example only, however, and in no way are limiting on the scope of the invention, as defined in the following claims.

The invention claimed is:

1. A data transmission switch configured to be carried onboard an aircraft, comprising:
an input connected to an ARINC 664 data bus functioning in multidirectional mode, and configured to receive data from a flight management computer on said ARINC 664 data bus, and
an output connected to a second transmission channel and configured to transmit said data to at least avionic equipment on said second transmission channel, said second transmission channel being one of an ARINC 429 bus or a memory shared between the switch and said avionic equipment,
said switch further comprising a transducer configured to generate synchronization instructions on said second transmission channel, said synchronization instructions comprising:
a verification of a possibility of transmission of data;
an indication of a start of transmission of data;
an indication of an end of the transmission of data.

2. The switch of claim 1, wherein said output is connected to a memory shared between the switch and said avionic equipment.

3. The switch of claim 2, wherein the transducer is configured to verify a state of a semaphore to verify the possibility of a transmission of data; to seize said semaphore prior to the transmission of data and to release said semaphore at the end of the transmission of data.

4. The switch of claim 1, wherein said output is connected to an ARINC 429 data bus.

5. The switch of claim 4, wherein the output data is sent in accordance with the Williamsburg protocol and in that the transducer is configured to send an "RTS" message to verify the possibility of a transmission of data, to send an "SOT" message prior to the transmission of data and to send an "EOT" message at the end of the transmission of data.

6. The switch of claim 1, further comprising a second output connected to an ARINC 429 bus to transmit data to an additional avionic equipment.

7. The switch of claim 6, being configured to transmit data on said second output in accordance with a periodic cycle.

8. A data transmission method intended to be executed by a transmission switch configured to be carried aboard an aircraft, said method comprising:
receiving, on an input of the transmission switch connected to an ARINC 664 data bus functioning in multidirectional mode, data from a flight control computer;
transmitting, on an output of the transmission switch connected to a second transmission channel, said data to avionic equipment, said second transmission channel being one of an ARINC 429 bus or a memory shared between the switch and said avionic equipment;
said method further comprising generating synchronization instructions on said second transmission channel, said synchronization instructions comprising:
a verification of a possibility of transmission of data;
an indication of a start of transmission of data;
an indication of an end of the transmission of data.

9. An avionic system comprising a switch according to claim 1, further comprising a tactile man-machine interface able to communicate simultaneously in accordance with an ARINC 661 protocol and an ARINC 739 protocol.

* * * * *